(12) United States Patent
Yokino et al.

(10) Patent No.: US 9,360,599 B2
(45) Date of Patent: Jun. 7, 2016

(54) OPTICAL ELEMENT AND METHOD OF MANUFACTURING SAME

(75) Inventors: Takafumi Yokino, Hamamatsu (JP); Katsumi Shibayama, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 133 days.

(21) Appl. No.: 13/983,850

(22) PCT Filed: Feb. 8, 2012

(86) PCT No.: PCT/JP2012/052844
§ 371 (c)(1),
(2), (4) Date: Oct. 7, 2013

(87) PCT Pub. No.: WO2012/108457
PCT Pub. Date: Aug. 16, 2012

(65) Prior Publication Data
US 2014/0022642 A1    Jan. 23, 2014

(30) Foreign Application Priority Data

Feb. 8, 2011    (JP) .................... 2011-025181

(51) Int. Cl.
| | | |
|---|---|---|
| B29D 11/00 | (2006.01) |
| G02B 5/18 | (2006.01) |
| G02B 5/08 | (2006.01) |
| G02B 5/00 | (2006.01) |
| B29C 43/02 | (2006.01) |
| B29C 43/36 | (2006.01) |
| B29L 11/00 | (2006.01) |

(52) U.S. Cl.
CPC ............ *G02B 5/0808* (2013.01); *B29C 43/021* (2013.01); *B29C 43/36* (2013.01); *B29D 11/00769* (2013.01); *G02B 5/00* (2013.01); *G02B 5/18* (2013.01); *B29L 2011/0016* (2013.01); *Y10T 428/24521* (2015.01)

(58) Field of Classification Search
CPC .. B29D 11/00769; G02B 5/00; G02B 5/0808; G02B 5/18; G21K 1/06; G21K 1/067; B29C 43/021; B29C 43/36; Y10T 428/24521; B29L 2011/0016
USPC .................. 359/566, 838, 568, 570, 574–576; 264/1.32; 427/162; 356/326
See application file for complete search history.

(56) References Cited

U.S. PATENT DOCUMENTS

| 3,592,529 | A * | 7/1971 | Juhlin et al. ................... 359/628 |
| 6,781,756 | B1 * | 8/2004 | Ishii ............................. 359/576 |

(Continued)

FOREIGN PATENT DOCUMENTS

| CN | 1367879 | 9/2002 |
| CN | 1477409 | 2/2004 |

(Continued)

*Primary Examiner* — Bumsuk Won
*Assistant Examiner* — Collin X Beatty
(74) *Attorney, Agent, or Firm* — Drinker Biddle & Reath LLP

(57) ABSTRACT

An optical element 1 comprises a base 2 having a surface 2a formed with a depression 3 and a formed layer 4 disposed on the base 2. The formed layer 4 has a main part 5 located within the depression 3 when seen in the depth direction of the depression 3 and an overhang 6 located on the surface 2a of the base 2 while being connected to the main part 5. A curved surface 4b opposing a bottom face 3b of the depression 3 in the main part 5 is provided with an optical function part 10.

6 Claims, 18 Drawing Sheets

(56) References Cited

U.S. PATENT DOCUMENTS

| | | | |
|---|---|---|---|
| 7,265,057 B2 * | 9/2007 | Liu | G02B 5/1852 216/67 |
| 8,451,443 B2 * | 5/2013 | Takizawa et al. | 356/328 |
| 2002/0015231 A1 * | 2/2002 | Ogawa | 359/566 |
| 2003/0112515 A1 * | 6/2003 | Nakabayashi | 359/571 |
| 2004/0263979 A1 * | 12/2004 | Kimura | 359/566 |
| 2009/0180185 A1 * | 7/2009 | Hayashi | B81C 99/0085 359/566 |
| 2009/0180186 A1 * | 7/2009 | Ando et al. | 359/566 |
| 2009/0194913 A1 * | 8/2009 | Chang | B29C 35/0805 264/447 |
| 2011/0026119 A1 * | 2/2011 | Suenaga et al. | 359/566 |
| 2011/0128541 A1 * | 6/2011 | Grueger | G01J 3/0256 356/326 |
| 2012/0002785 A1 * | 1/2012 | Kaneko | 378/62 |
| 2012/0019923 A1 * | 1/2012 | Niesten | 359/630 |
| 2012/0327514 A1 * | 12/2012 | Takano et al. | 359/576 |
| 2013/0010362 A1 * | 1/2013 | Tokunaga et al. | 359/558 |
| 2013/0039661 A1 * | 2/2013 | Luo et al. | 398/79 |
| 2013/0141790 A1 * | 6/2013 | Shimizu et al. | 359/569 |
| 2013/0170041 A1 * | 7/2013 | Okada et al. | 359/566 |
| 2013/0301132 A1 * | 11/2013 | Niwa | 359/576 |
| 2014/0118830 A1 * | 5/2014 | Mueller et al. | 359/572 |

FOREIGN PATENT DOCUMENTS

| | | |
|---|---|---|
| CN | 1501112 | 6/2004 |
| CN | 1993748 | 7/2007 |
| CN | 101246229 | 8/2008 |
| CN | 102375167 | 3/2012 |
| JP | H05-220773 A | 8/1993 |
| JP | H06-59104 A | 3/1994 |
| JP | H07-72310 A | 3/1995 |
| JP | 2003-266450 A | 9/2003 |
| JP | 2004-133328 | 4/2004 |
| JP | 2005-173597 A | 6/2005 |
| JP | 2005-520213 A | 7/2005 |
| JP | 2006-177994 A | 7/2006 |
| JP | 2007-199540 A | 8/2007 |
| WO | WO 2010/073675 | 7/2010 |

* cited by examiner

OPTICAL ELEMENT AND METHOD OF MANUFACTURING SAME

TECHNICAL FIELD

The present invention relates to an optical element and a method of manufacturing the same.

BACKGROUND ART

Known as a conventional method of manufacturing an optical element is one pressing a forming mold against a resin material arranged within a depression in a base and curing the resin material, so as to form a formed layer provided with an optical function part such as a grating within the depression in the base (see, for example, Patent Literatures 1 to 5).

CITATION LIST

Patent Literature

Patent Literature 1: Japanese Patent Application Laid-Open No. 2006-177994
Patent Literature 2: Japanese Patent Application Laid-Open No. 2007-199540
Patent Literature 3: Japanese Patent Application Laid-Open No. 2003-266450
Patent Literature 4: Japanese Patent Application Laid-Open No. 2005-173597
Patent Literature 5: Japanese Translated International Application Laid-Open No. 2005-520213

SUMMARY OF INVENTION

Technical Problem

In the optical element manufactured by the method mentioned above, however, the formed layer as a whole is located within the depression in the base, while stresses generated upon changes in temperature during use and the like are concentrated at the depression in the base, whereby the formed layer may peel off the base. Further, the formed layer may shrink or expand due to temperature changes during use and the like, thereby deforming the optical function part provided with the formed layer.

It is therefore an object of the present invention to provide an optical element which can prevent the formed layer from peeling and the optical function part from deforming and a method of manufacturing the same.

Solution to Problem

The optical element in accordance with one aspect of the present invention comprises a base having a surface formed with a depression and a formed layer disposed on the base, wherein the formed layer has a first part located within the depression when seen in a thickness direction of the depression and a second part located on the surface of the base while being connected to the first part, and wherein a predetermined surface in the first part opposing an inner face of the depression is provided with an optical function part.

In this optical element, even when stresses generated due to temperature changes during use and the like are concentrated at the depression in the base, the second part located on the surface of the base while being connected to the first part presses the first part located within the depression of the base. This prevents the formed layer from peeling off the base. The shrinkage and expansion of the formed layer caused by temperature changes during use and the like are absorbed by the second part located on the surface of the base, so as to relieve the first part located within the depression of the base from shrinking and expanding. This prevents a predetermined surface of the first part from being distorted, thereby keeping the optical function part provided with the predetermined surface from deforming. As in the foregoing, this optical element can prevent the formed layer from peeling and the optical function part from deforming.

Here, a plurality of second parts may be provided so as to oppose each other through the depression interposed therebetween. A plurality of second parts may be provided so as to surround the depression. These can more securely prevent the formed layer from peeling and the optical function part from deforming.

The optical function part may be a grating. Alternatively, the optical function part may be a mirror. These can yield a grating element or mirror element in a simple structure.

The method of manufacturing an optical element in accordance with one aspect of the present invention comprises the steps of preparing a base having a surface formed with a depression; arranging a forming material on the base; and pressing a forming mold against the forming material and curing the forming material so as to form a formed layer having a first part located within the depression when seen in a thickness direction of the depression and a second part located on the surface of the base while being connected to the first part; wherein the forming mold has a forming surface for forming the first part with a predetermined surface to be provided with an optical function part such that the predetermined surface opposes an inner face of the depression.

When the forming material shrinks upon curing in this method of manufacturing an optical element, the second part located on the surface of the base while being connected to the first part shrinks in preference to the first part, thereby relieving the first part located within the depression of the base from shrinking. This prevents a predetermined surface of the first part from being distorted, thereby keeping the optical function part provided with the predetermined surface from deforming. Even when stresses generated due to temperature changes during use and the like are concentrated at the depression in the base, the second part located on the surface of the base while being connected to the first part presses the first part located within the depression of the base. This prevents the formed layer from peeling off the base. As in the foregoing, this optical element manufacturing method can prevent the formed layer from peeling and the optical function part from deforming.

The forming surface may be formed so as to come into intermittent contact with an opening of the depression when the forming mold is pressed against the forming material. This allows gases generated from the forming material upon curing, if any, to escape from noncontact parts between the forming surface of the forming mold and the opening of the depression and thus can prevent voids from being formed in the formed layer.

Advantageous Effects of Invention

The present invention can prevent the formed layer from peeling and the optical function part from deforming.

DESCRIPTION OF EMBODIMENTS

Figure 1:
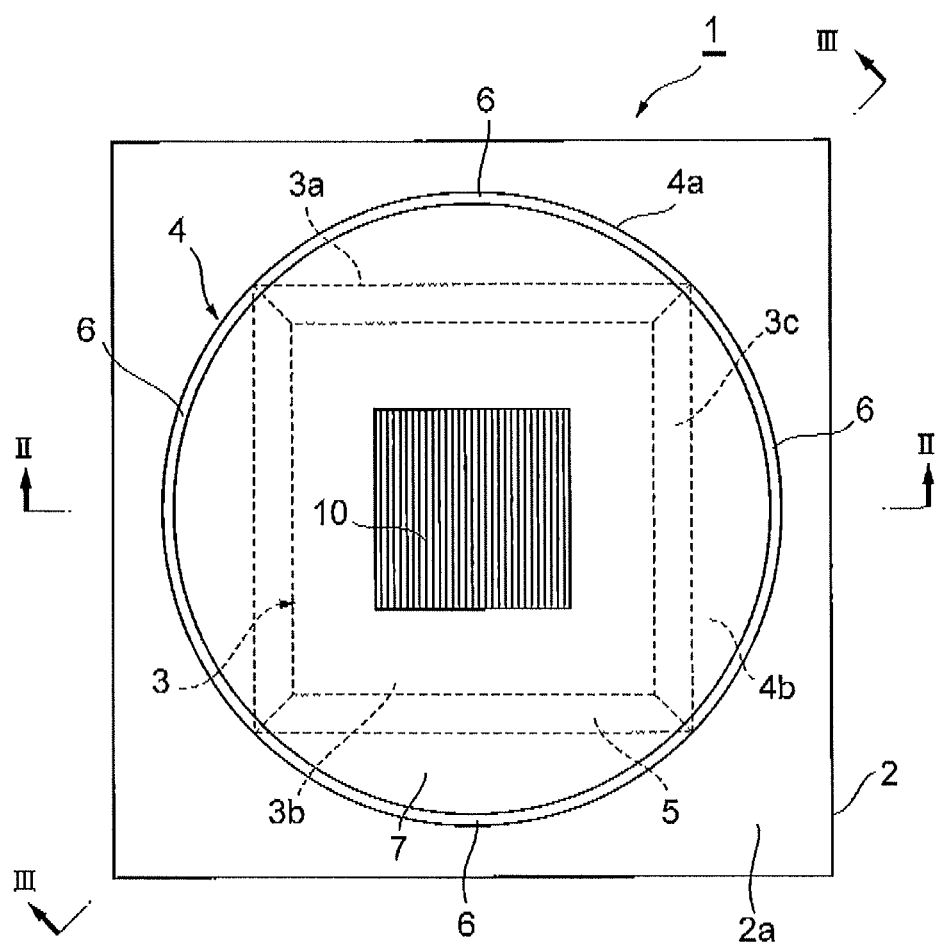
FIG. 1 is a plan view of the optical element in accordance with a first embodiment of the present invention.

In the following, preferred embodiments of the present invention will be explained in detail with reference to the drawings. In the drawings, the same or equivalent parts will be referred to with the same signs while omitting their overlapping descriptions.

First Embodiment

Figure 2:
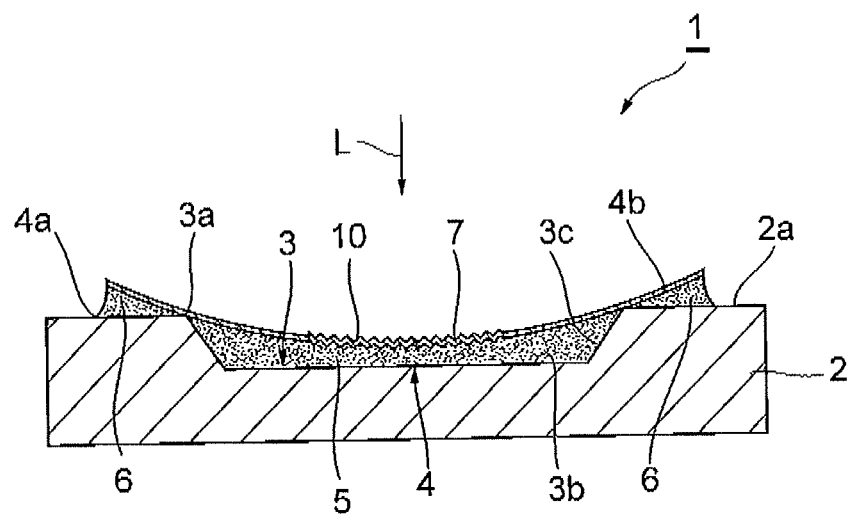
FIG. 2 is a cross-sectional view of the optical element taken along the line II-II of FIG. 1.
Figure 3:
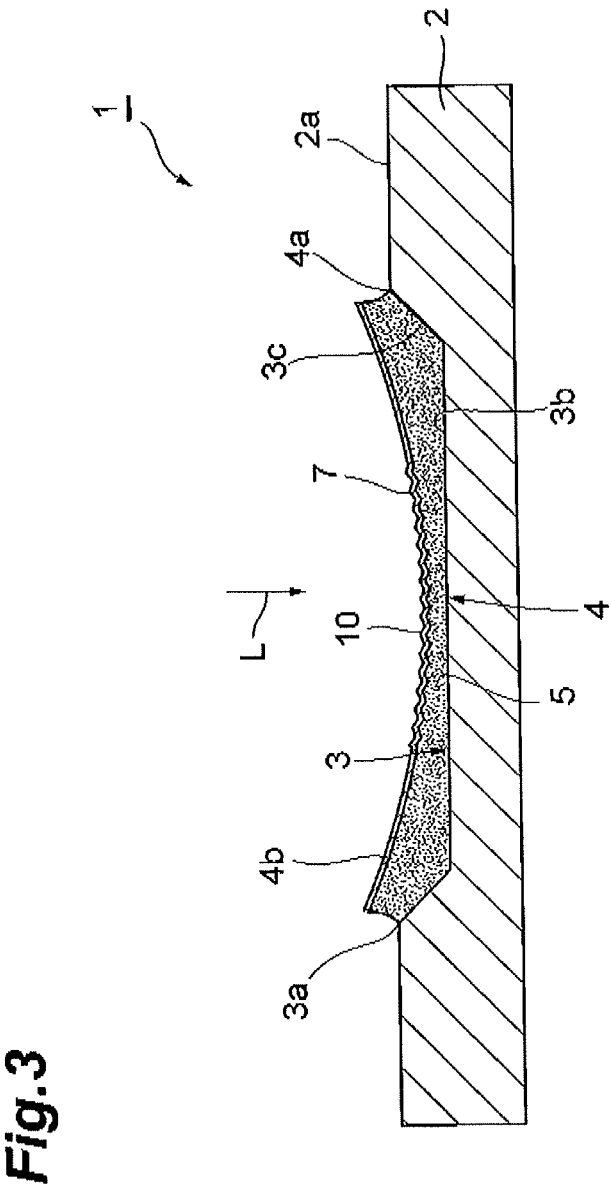
FIG. 3 is a cross-sectional view of the optical element taken along the line III-III of FIG. 1.

As illustrated in FIGS. 1, 2, and 3, the optical element 1 in accordance with the first embodiment has an optical function part 10 which is a reflection grating. The optical function part 10 spectrally resolves and reflects light L incident thereon from one side thereof. The optical element 1 comprises a base 2 shaped into a square sheet (having an outer form of 12 mm×12 mm with a thickness of 0.6 mm, for example) made of silicon, plastic, ceramic, glass, or the like. A surface 2a of the base 2 is formed with a depression 3 shaped into a frustum of a square pyramid widening toward an opening 3a. Various materials can be employed for the base 2 without being restricted to those mentioned above. Various forms can be employed for the base 2 and depression 3 without being restricted to those mentioned above. For more securely preventing a formed layer 4 which will be explained later and the optical function part 10 from deforming, however, it is preferred for the depression 3 to have a form which is symmetrical with respect to a center point of the depression 3 when seen in the depth direction of the depression 3.

Disposed on the base 2 is a formed layer 4 formed by photocuring a replica optical resin such as a photocurable epoxy, acrylic, fluorine-based, silicone, or organic-inorganic hybrid resin. The formed layer 4 is circular when seen in the depth direction (i.e., from one side) of the depression 3 and has an outer edge 4a passing all the vertices of the square opening 3a. Without being restricted to the photocurable resin materials mentioned above, various materials (forming materials) such as thermosetting resin materials, low-melting glass, and organic-inorganic hybrid glass which can be molded and cured by a forming mold 30 which will be explained later can be employed for the formed layer 4.

The formed layer 4 has a main part (first part) 5 and overhangs (second part) 6 which are formed integrally with each other. The main part 5 is located within the depression 3 when seen in the depth direction of the depression 3 and totally covers the bottom face 3b and side faces 3c of the depression 3. The overhangs 6 are located on the surface 2a of the base 2 while being connected to the main part 5 and disposed on the outside of all the sides of the square opening 3a. That is, a plurality of overhangs 6 are provided so as to oppose each other through the depression 3 interposed therebetween and surround the depression 3.

The formed layer 4 has a concave curved surface (predetermined surface) 4b opposing the bottom face 3b that is a predetermined inner face of the depression 3. The curved surface 4b is depressed toward the center of the bottom face 3b of the depression 3 and extends from the main part 5 to the overhangs 6 through the respective midpoints of all the sides of the square opening 3a. A predetermined area on the main part 5 in the curved surface 4b is formed with a grating pattern corresponding to a blazed grating having a saw-toothed cross section, a binary grating having a rectangular cross section, a holographic grating having a sinusoidal cross section, or the like.

A reflecting film 7 which is a vapor-deposited film of Al, Au, or the like is formed on the curved surface 4b of the formed layer 4. The reflecting film 7 is formed so as to correspond to the grating pattern in a predetermined region on the main part 5 in the curved surface 4b, and this portion is the optical function part 10 serving as a reflection grating. Various materials can be employed for the reflecting film 7 without being restricted to those mentioned above.

As explained in the foregoing, even when stresses generated due to temperature changes during use and the like are concentrated at the depression 3 in the base 2 in the optical element 1 in accordance with the first embodiment, the overhangs 6 located on the surface 2a of the base 2 while being connected to the main part 5 press the main part 5 located within the depression 3 of the base 2. The fact that the surface 2a on which the overhangs 6 are located is a surface (flat surface here) which is discontinuous with the side faces (inner faces) 3c of the depression 3 contributes to this action. In addition, a plurality of overhangs 6 which are provided so as to oppose each other through the depression 3 interposed therebetween and surround the depression 3 press the main part 5 uniformly from the surroundings thereof. This securely prevents the formed layer 4 from peeling off the base 2. The shrinkage and expansion of the formed layer 4 caused by temperature changes during use and the like are absorbed by the overhangs 6 located on the surface 2a of the base 2, so as to relieve the main part 5 located within the depression 3 of the base 2 from shrinking and expanding. In addition, a plurality of overhangs 6 which are provided so as to oppose each other through the depression 3 interposed therebetween and surround the depression 3 uniformly relieve the main part 5 from shrinking and expanding. This securely prevents the curved surface 4b of the main part 4 from being distorted, thereby reliably keeping the optical function part 10 provided on the curved surface 4b from deforming. Hence, in a simple structure, the optical element 1 in accordance with the first embodiment can securely prevent the formed layer 4 from peeling and the optical function part 10 from deforming.

Since the surface provided with the optical function part 10 is the curved surface 4b formed in the formed layer 4 so as to oppose the bottom face 3b of the depression 3, the formed layer 4 can be made thinner, so as to restrain the formed layer 4 itself from shrinking and expanding due to temperature changes during use and the like.

Figure 4:
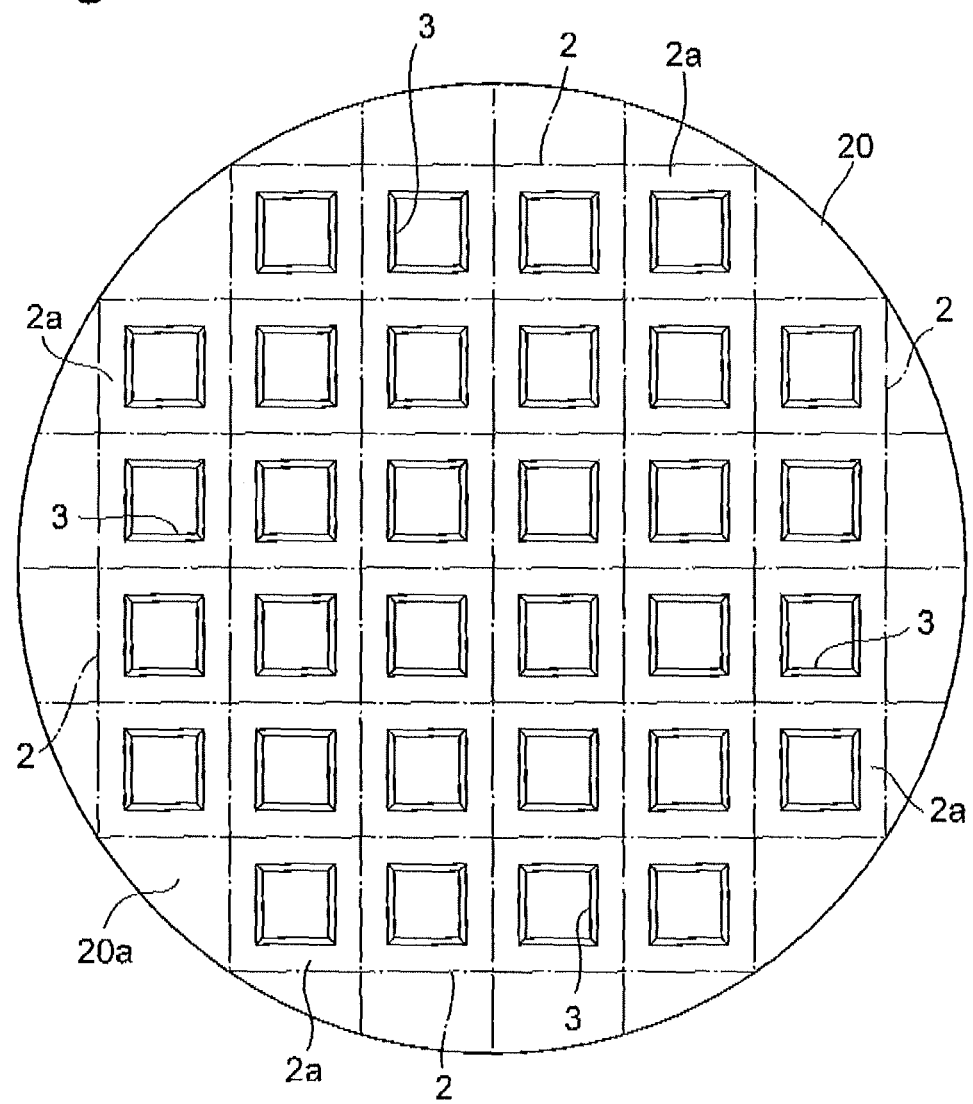
FIG. 4 is a plan view of a substrate in a step in a method of manufacturing the optical element of FIG. 1.

A method of manufacturing the above-mentioned optical element 1 will now be explained. First, as illustrated in FIG. 4, a substrate 20 made of silicon, for example, is prepared. The substrate 20 produces a plurality of bases 2 when cut (diced) into a lattice pattern. The depression 3 is formed by etching or the like for each surface 2a of the base 2 on a surface 20a of the substrate 20. This prepares a plurality of bases 2 each having the depression 3 formed on the surface 2a. Subsequently, a forming material (a photocurable resin material here) to become the formed layer 4 is arranged for each depression 3 of the base 2 on the surface 20a of the substrate 20. This arranges the forming material on the plurality of bases 2.

Figure 5:
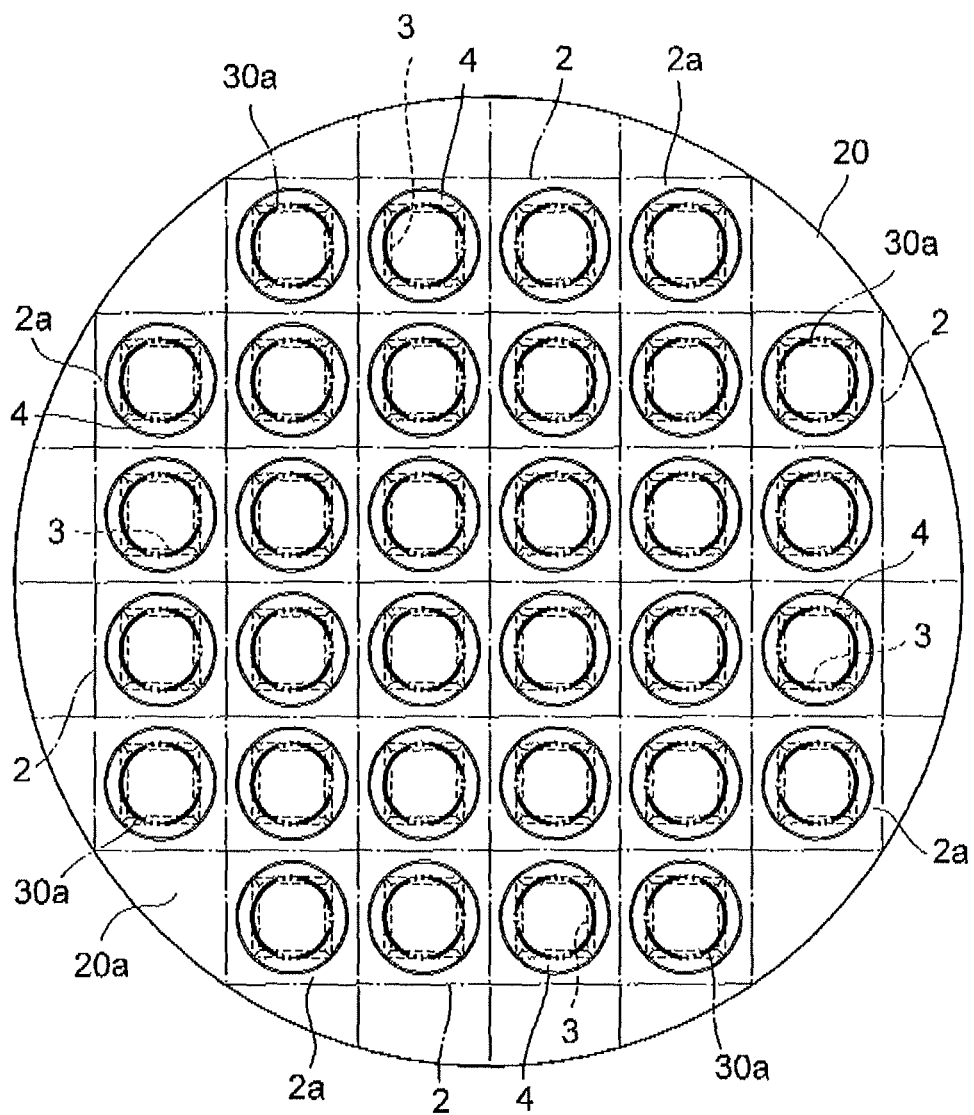
FIG. 5 is a plan view of the substrate in a step subsequent to that of FIG. 4.
Figure 6:
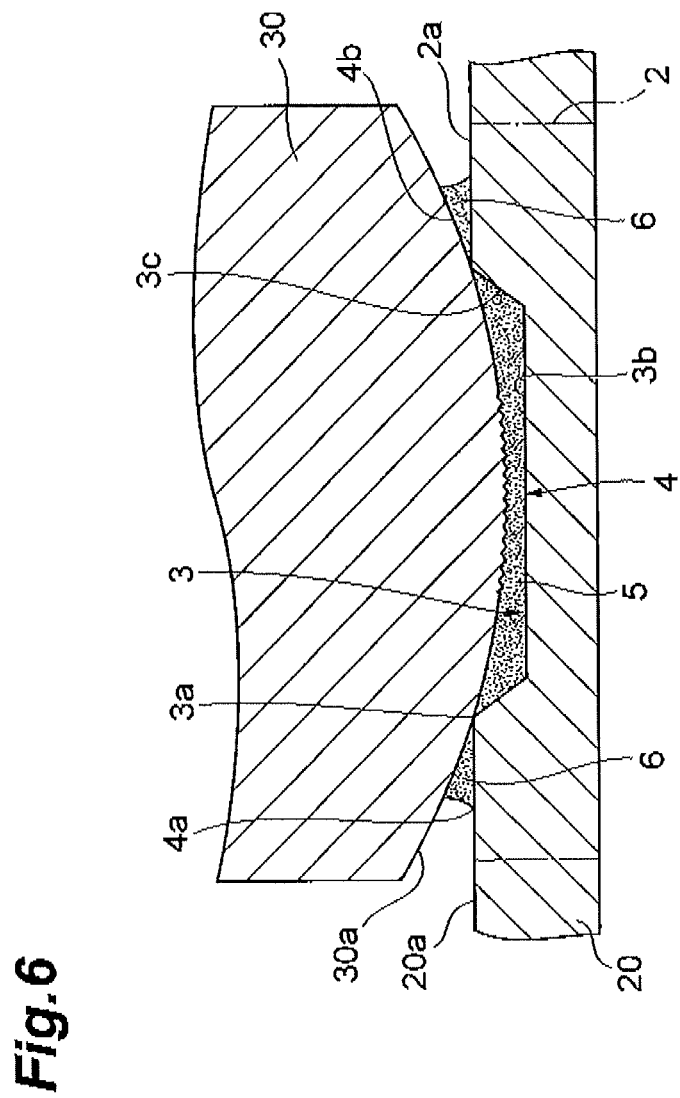
FIG. 6 is a sectional view of the substrate taken along the line VI-VI of FIG. 5.

Next, as illustrated in FIGS. 5 and 6, the forming mold 30 is pressed against each depression 3 of the base 2. In this state, the forming material is irradiated with light (e.g., UV rays) for photocuring the forming material transmitted through the forming mold 30, so as to form the formed layer 4 having the main part 5 and overhangs 6. The formed layer 4 may further be thermally cured after releasing the forming mold 30 therefrom. If the base 2 is transparent to the light for photocuring the forming material, the latter may be irradiated with the light transmitted through the base 2. Various curing methods such as thermal curing can be employed as a method of curing the forming material according to the kind thereof without being restricted to photocuring.

The forming mold 30 has a forming surface 30a for forming the main part 5 and overhangs 6 with the curved surface 4b to be provided with the optical function part 10 such that the curved surface 4b opposes the bottom face 3b of the depression 3. The forming surface 30a is formed so as to come into intermittent contact with the opening 3a of the depression 3 when the forming mold 30 is pressed against the forming material. Here, the forming surface 30a is a convex curved surface, which is complementary with the curved surface 4b, and comes into contact with the respective midpoints of all the sides of the square opening 3a.

Figure 7:
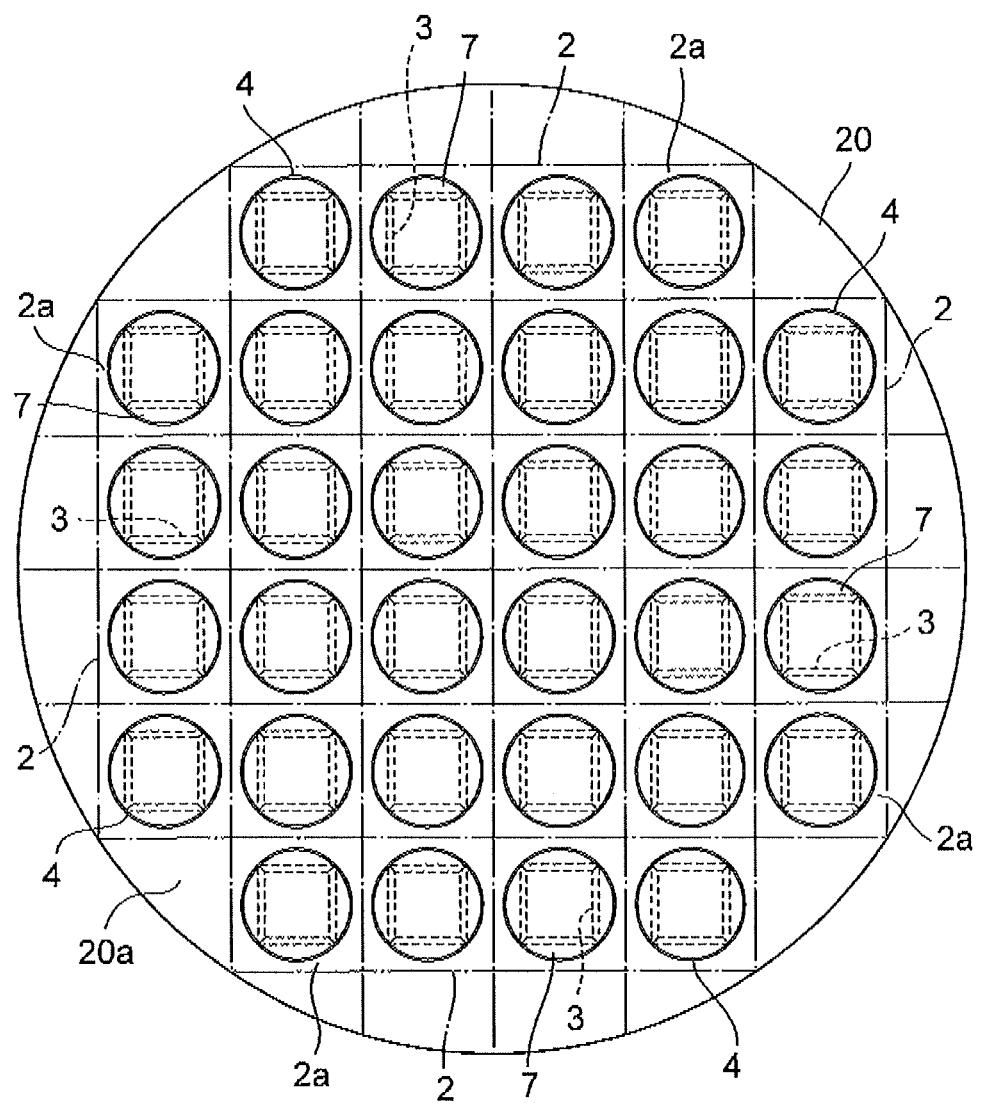
FIG. 7 is a plan view of the substrate in a step subsequent to that of FIG. 5.

Subsequently, as illustrated in FIG. 7, the reflecting film 7 is formed on the curved surface 4b of the formed layer 4 by vapor-depositing Al, Au, or the like, so as to provide the optical function part 10 for each curved surface 4b. The vapor deposition is performed for the whole curved surface 4b or a given area thereof (through masked vapor deposition) as necessary. Then, the substrate 20 is cut (diced) into a lattice pattern, so as to yield a plurality of optical elements 1 which are grating elements.

As explained in the foregoing, when the forming material shrinks upon curing in the method of manufacturing the optical element 1, the overhangs 6 located on the surface 2a of the base 2 while being connected to the main part 5 shrink in preference to the main part 5, thereby relieving the main part 5 located within the depression 3 of the base 2 from shrinking. In addition, a plurality of overhangs 6 which are provided so as to oppose each other through the depression 3 interposed therebetween and surround the depression 3 uniformly relieve the main part 5 from shrinking and expanding. This securely prevents the curved surface 4b of the main part 5 from being distorted, thereby reliably keeping the optical function part 10 provided on the curved surface 4b from deforming. Even when stresses generated due to temperature changes during use and the like are concentrated at the depression 3 in the base 2, the overhangs 6 located on the surface 2a of the base 2 while being connected to the main part 5 press the main part 5 located within the depression 3 of the base 2. In addition, a plurality of overhangs 6 which are provided so as to oppose each other through the depression 3 interposed therebetween and surround the depression 3 press the main part 5 uniformly from the surroundings thereof. This securely prevents the formed layer 4 from peeling off the base 2. Hence, the method of manufacturing the optical element 1 can securely prevent the formed layer 4 from peeling and the optical function part 10 from deforming.

The forming surface 30a of the forming mold 30 is formed so as to come into intermittent contact with the opening 3a of the depression 3 when the forming mold 30 is pressed against the forming material. This allows gases generated from the forming material upon curing, if any, to escape from noncontact parts between the forming surface 30a of the forming mold 30 and the opening 3a of the depression 3 and thus can prevent voids from being formed in the formed layer 4.

When the forming mold 30 is pressed against the forming material, a sufficient pressure is applied to the forming material within the depression 3, so that a grating pattern can be formed stably and accurately in a predetermined region on the main part 5 in the curved surface 4b.

When the forming mold 30 is pressed against the forming material, the forming surface 30a of the forming mold 30 comes into contact with the opening 3a of the depression 3 at a plurality of points, whereby the forming mold 30 can be positioned easily and accurately in the height direction thereof (i.e., in the depth direction of the depression 3). This also prevents a pattern of the forming surface 30a for transferring the grating pattern from coming into contact with the bottom face 3b of the depression 3.

The above-mentioned method of manufacturing the optical element 1 can also manufacture a plurality of kinds of optical elements 1 by employing a plurality of kinds of forming molds 30 such as those having forming surfaces 30a with different curvatures with respect to one kind of base 2 having the surface 2a formed with the depression 3.

Second Embodiment

Figure 8:
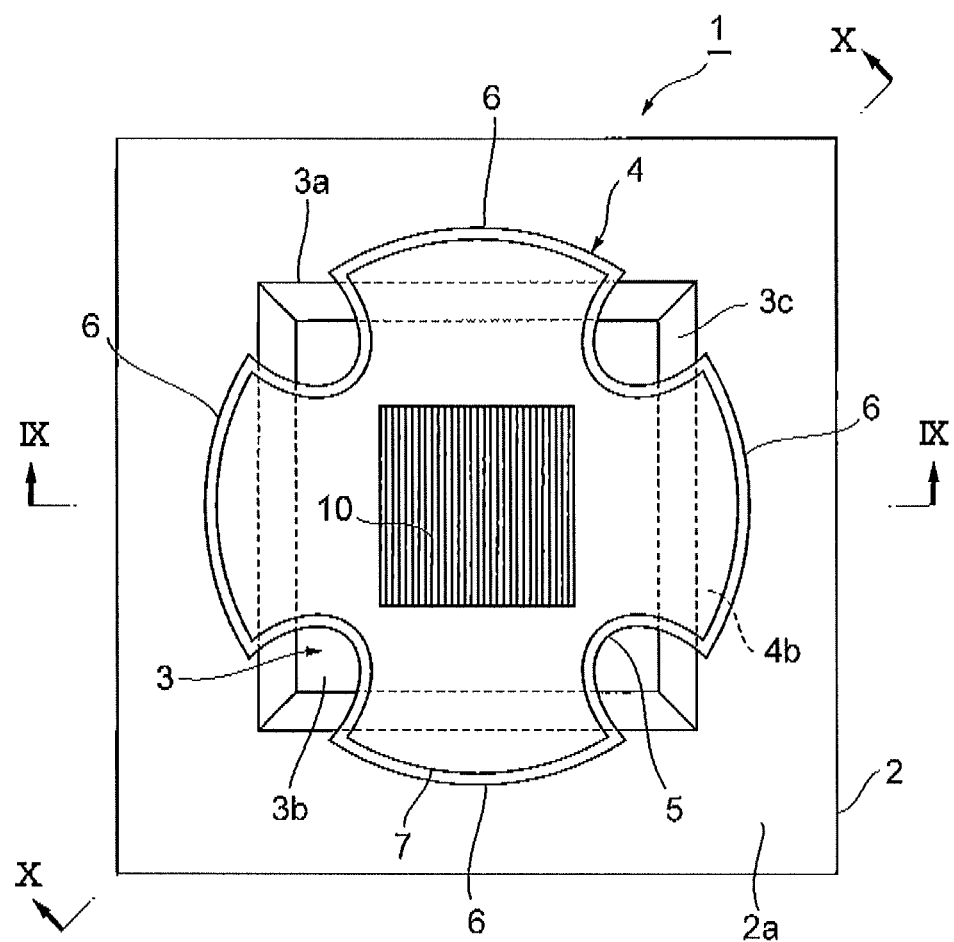
FIG. 8 is a plan view of the optical element in accordance with a second embodiment of the present invention.
Figure 9:
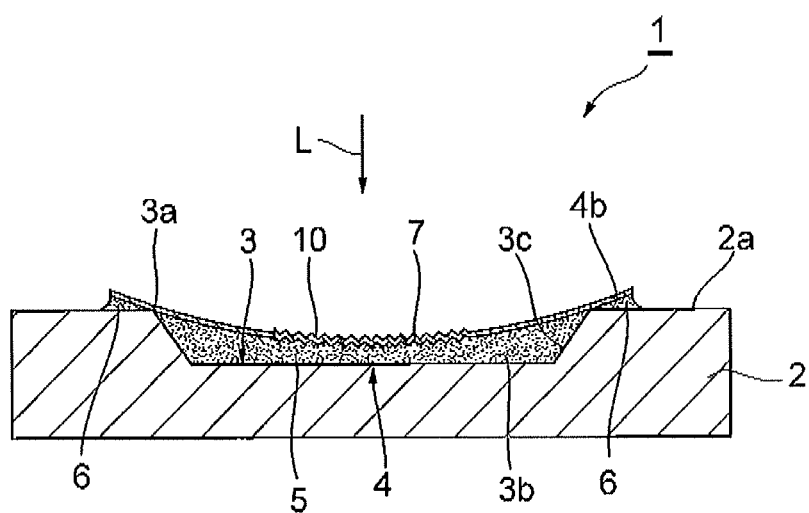
FIG. 9 is a cross-sectional view of the optical element taken along the line IX-IX of FIG. 8.
Figure 10:
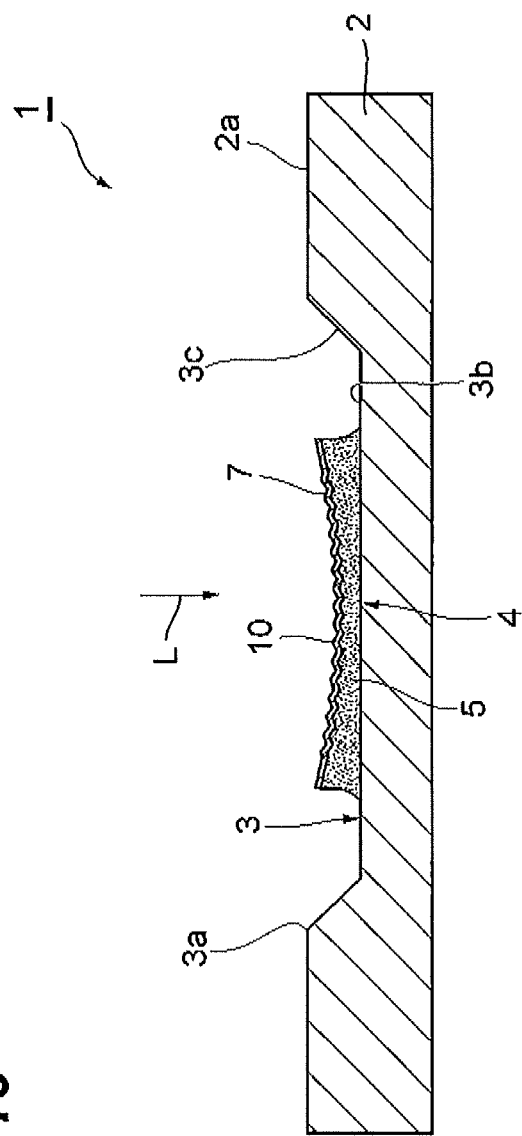
FIG. 10 is a cross-sectional view of the optical element taken along the line X-X of FIG. 8.

As illustrated in FIGS. 8, 9, and 10, the optical element 1 in accordance with the second embodiment differs from the optical element 1 in accordance with the first embodiment mainly in that the main part 5 of the formed layer 4 does not totally cover the bottom face 3b and side faces 3c of the depression 3. In the optical element 1 of the second embodiment, the main part 5 is retracted from all the corners of the depression 3. This is because of the fact that, when curing, the forming material shrinks preferentially from noncontact parts between the forming surface 30a of the forming mold 30 and the opening 3a of the depression 3. Such a state is more likely to occur when the forming material is relatively small in amount or low in viscosity. Even in such a case, the forming material rides on the surface 2a of the base 2 at contact parts between the forming surface 30a of the forming mold 30 and the opening 3a of the depression 3 and is harder to retract therefrom, whereby the overhangs 6 are formed there. Hence, the optical element 1 of the second embodiment exhibits the same effects as with the optical element 1 of the first embodiment.

Third Embodiment

Figure 11:
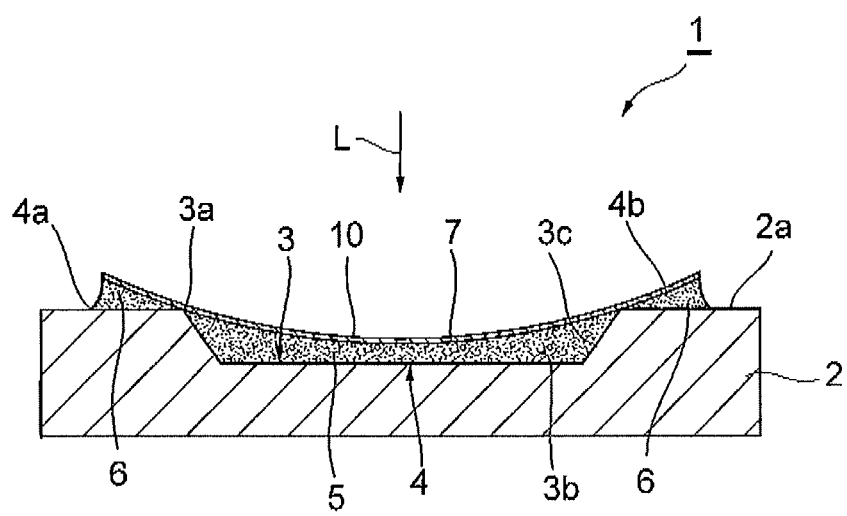
FIG. 11 is a vertical cross-sectional view of the optical element in accordance with a third embodiment of the present invention.

As illustrated in FIG. 11, the optical element 1 in accordance with the third embodiment differs from the optical element 1 in accordance with the first embodiment mainly in that the optical function part 10 is a mirror. In the optical element 1 of the third embodiment, the curved surface 4b of the formed layer 4 and the reflecting film 7 are formed with no grating pattern, while the optical function part 10 is a mirror. Thus, the optical function part 10 may have various optical functions such as a mirror without being restricted to gratings. Hence, the optical element 1 of the third embodiment exhibits the effect of being able to yield a mirror element in a simple structure in addition to the same effects as with the optical element 1 of the first embodiment.

Fourth Embodiment

Figure 12:
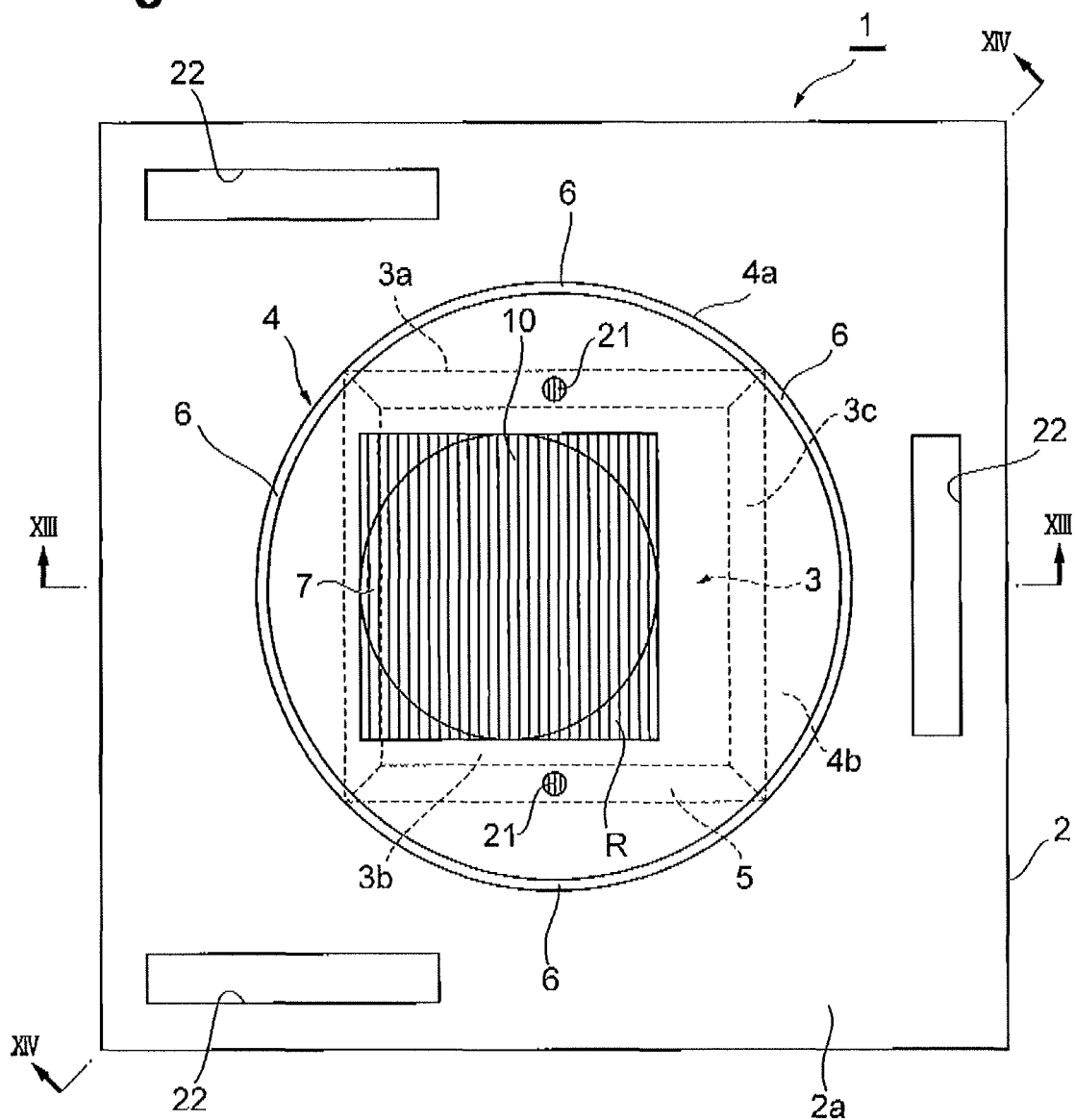
FIG. 12 is a plan view of the optical element in accordance with a fourth embodiment of the present invention.
Figure 13:
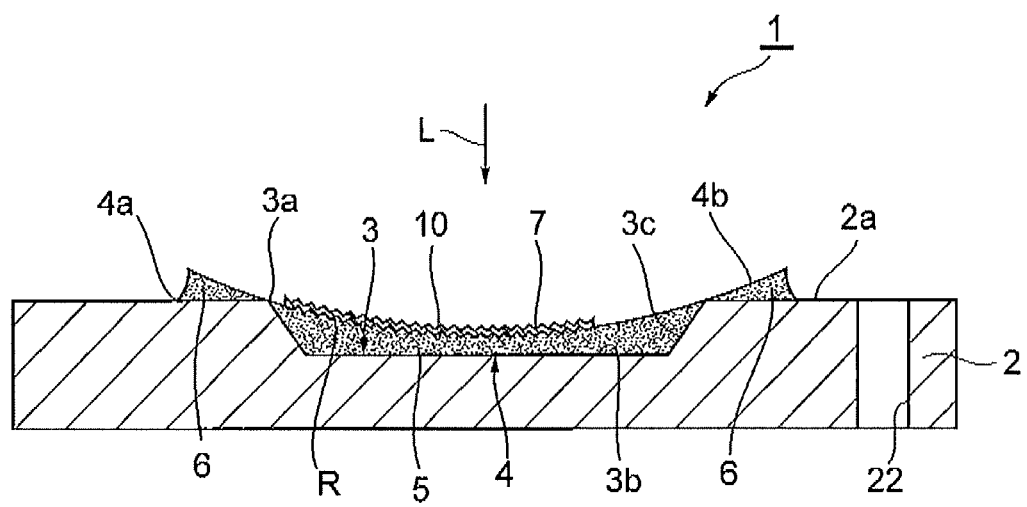
FIG. 13 is a cross-sectional view of the optical element taken along the line XIII-XIII of FIG. 12.
Figure 14:
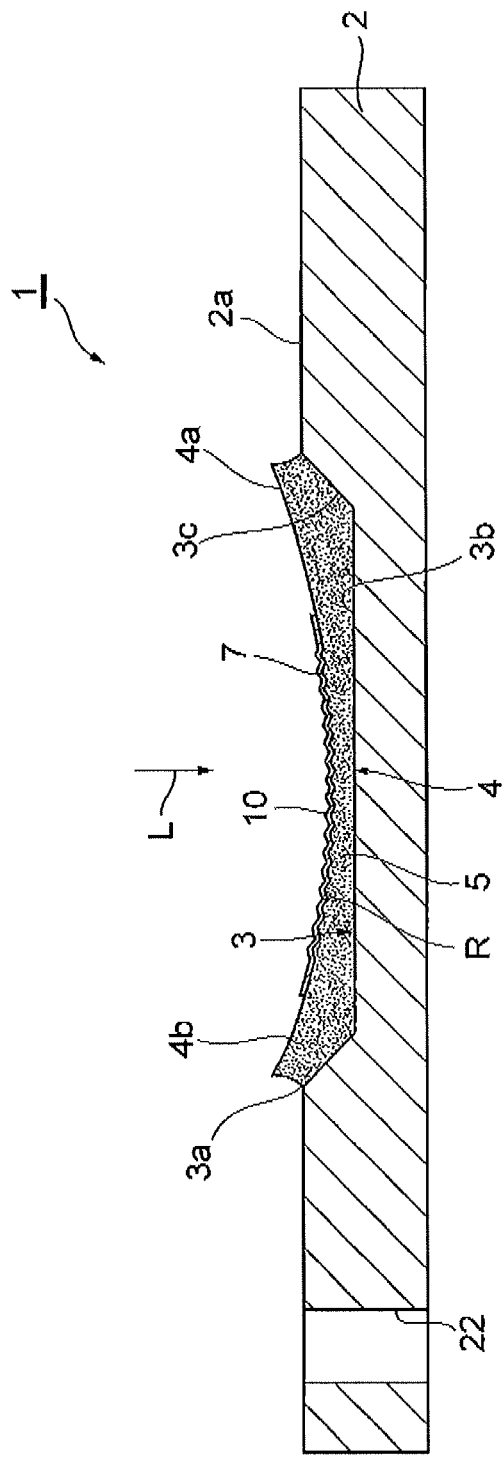
FIG. 14 is a cross-sectional view of the optical element taken along the line XIV-XIV of FIG. 12.

As illustrated in FIGS. 12, 13, and 14, the optical element 1 in accordance with the fourth embodiment differs from the optical element 1 in accordance with the first embodiment mainly in that the formed layer 4 is provided with alignment marks 21 and that the base 2 is provided with positioners 22.

In the optical element 1 of the fourth embodiment, a grating pattern is formed in a predetermined rectangular region R in the curved surface 4b of the formed layer 4. A pair of alignment marks 21 are disposed so as to hold the grating pattern (i.e., optical function part 10) therebetween in the extending direction of grating grooves of the grating pattern. The predetermined region R and alignment marks 21 are located within a region corresponding to the main part 5 in the curved surface 4b of the formed layer 4.

Here, the grating pattern formed in the predetermined region R is shifted from the center of the depression 3 in a direction perpendicular to the extending direction of the grating grooves when seen in the depth direction of the depression 3. The reflecting film 7 is formed into a circle inscribed in the predetermined region R when seen in the depth direction of the depression 3.

The alignment marks 21 are formed together with the grating pattern when the formed layer 4 is formed by the forming mold 30. Hence, the alignment marks 21 are positioned with high precision with respect to the grating pattern (i.e., optical function part 10).

A plurality of positioners 22, each of which is a hole having a rectangular cross section and penetrating through the base 2, are provided about the depression 3 and formed layer 4. The positioners 22 are formed together with the depression 3 by etching or the like. Hence, the positioners 22 are positioned with high precision with respect to the depression 3. Since the grating pattern is positioned with high precision with respect to the depression 3 when the formed layer 4 is formed by the forming mold 30, the positioners 22 are positioned with high precision with respect to the grating pattern (i.e., optical function part 10).

Thus constructed optical element 1 of the fourth embodiment exhibits the following effects in addition to those of the optical element 1 of the first embodiment.

That is, when accommodating the optical element 1 in a package provided with a light entrance part, for example, the optical function part 10 can be positioned with respect to the light entrance part of the package by fitting projections provided with the package into the positioners 22, inserting lead pins penetrating through the package into the positioners 22, and so forth.

When accommodating a photodetection unit for detecting light spectrally resolved by the optical function part 10 together with the optical element 1 in a package provided with a light entrance part, for example, the photodetection unit can be positioned with respect to the optical function part 10 with reference to the alignment marks 21. At this time, the alignment marks 21 are located within a region corresponding to the main part 5 in the curved surface 4b of the formed layer 4 and thus are less likely to incur distortions and misalignment.

For example, fitting projections provided with the photodetection unit into the positioners 22 can produce a firm spectroscopic unit in which the photodetection unit is positioned with respect to the optical function part 10.

The reflecting film 7, which is formed so as to cover a part of the predetermined region R, can control the entrance NA with respect to the photodetection unit for detecting the light spectrally resolved by the optical function part 10. In this case, the reflecting film 7 may be elliptical or rectangular or partly protrude from the predetermined region R.

The positioners 22 may be recesses without being restricted to the holes penetrating through the base 2. In this case, projections provided with a package, end parts of lead pins penetrating through the package, projections provided with a photodetection unit, and the like are fitted into the positioners 22.

Fifth Embodiment

Figure 15:
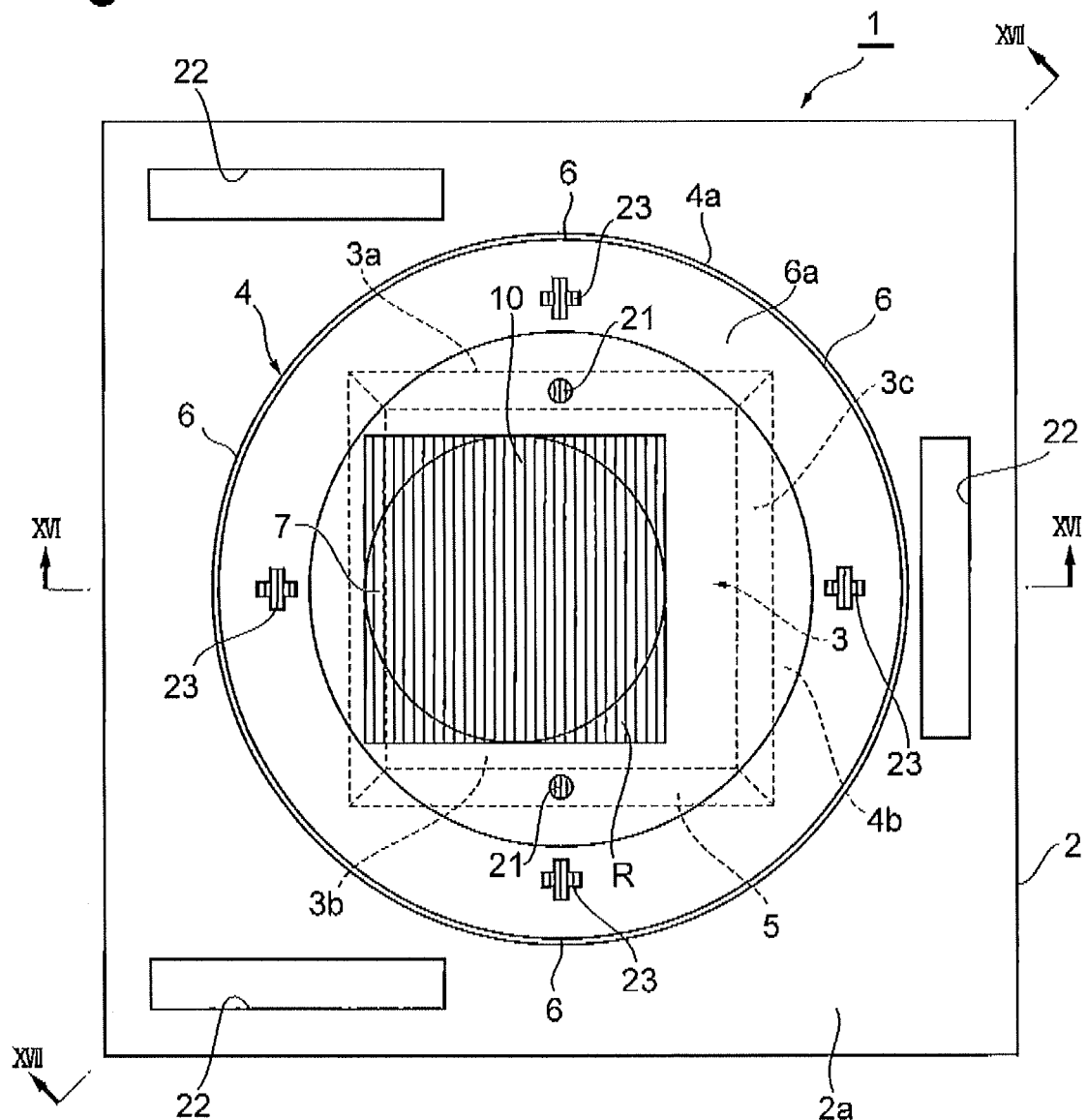
FIG. 15 is a plan view of the optical element in accordance with a fifth embodiment of the present invention.
Figure 16:
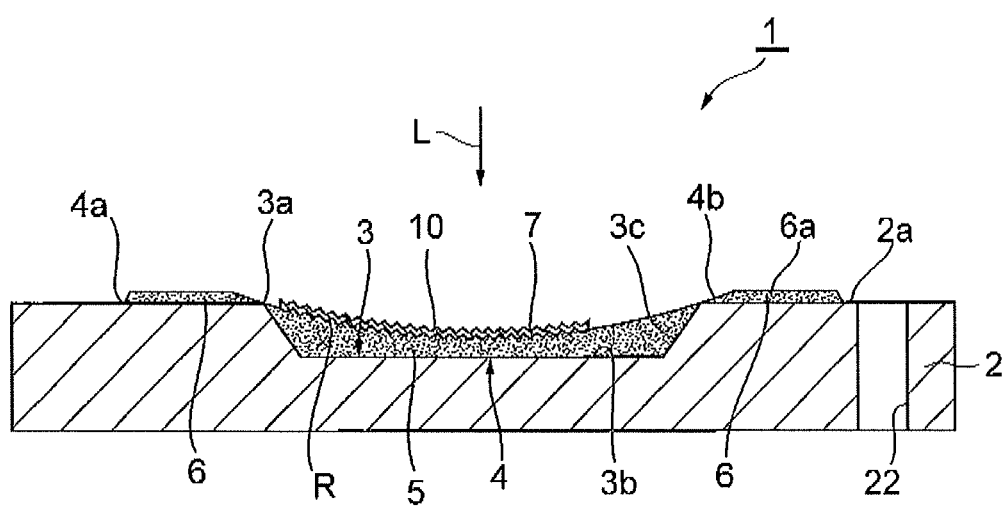
FIG. 16 is a cross-sectional view of the optical element taken along the line XVI-XVI of FIG. 15.
Figure 17:
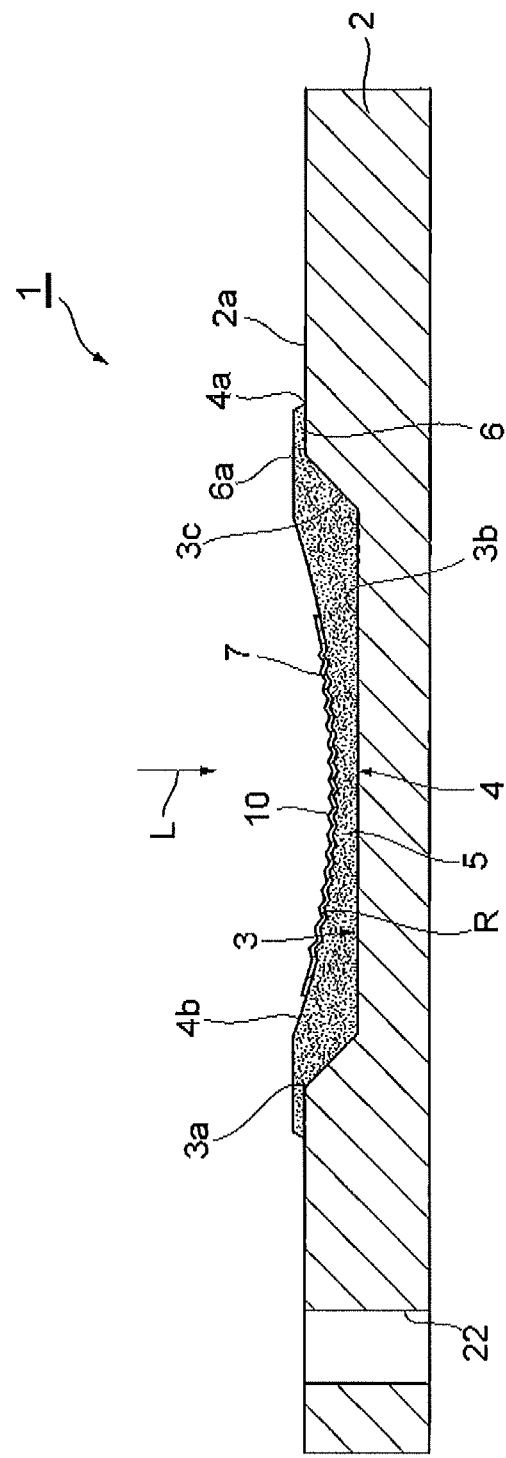
FIG. 17 is a cross-sectional view of the optical element taken along the line XVII-XVII of FIG. 15.

As illustrated in FIGS. 15, 16, and 17, the optical element 1 in accordance with the fifth embodiment differs from the optical element 1 in accordance with the fourth embodiment mainly in that the overhang 6 of the formed layer 4 is made flat.

In the optical element 1 of the fifth embodiment, the overhang 6 has a flat surface 6a which is substantially parallel to the surface 2a of the base 2 and provided with alignment marks 23. Two pairs of alignment marks 23 are provided so as to hold therebetween a grating pattern formed in a predetermined region R. More specifically, a pair of alignment marks 23 are disposed so as to hold therebetween the grating pattern (i.e., optical function part 10) in the extending direction of the grating grooves, while a pair of alignment marks 23 are disposed so as to hold therebetween the grating pattern (i.e., optical function part 10) in a direction perpendicular to the extending direction of the grating grooves.

Figure 18:
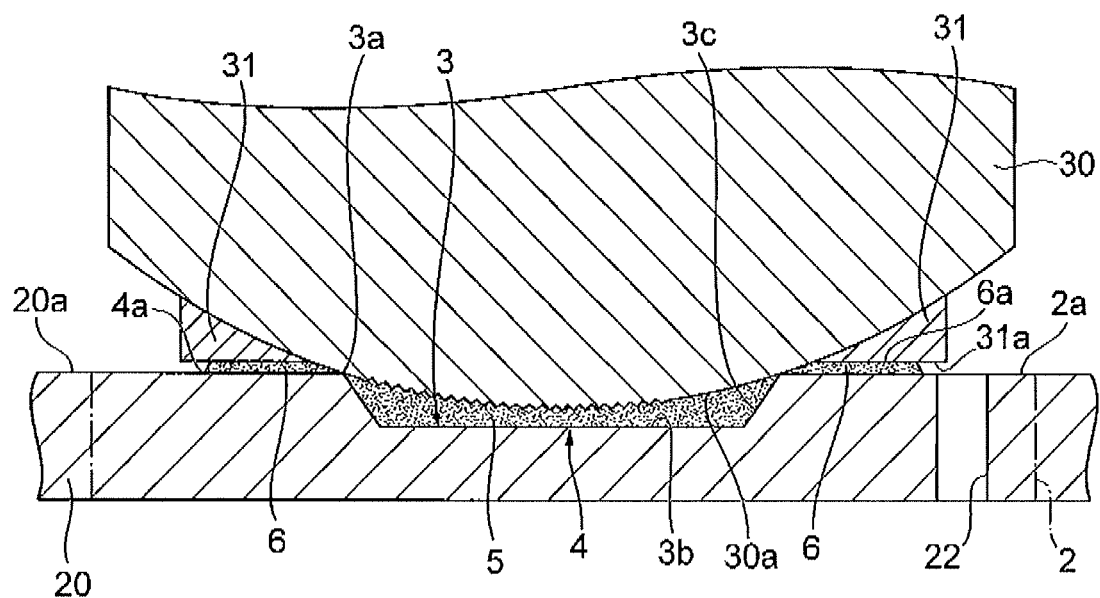
FIG. 18 is a cross-sectional view of a substrate in a step in a method of manufacturing the optical element of FIG. 15.

The alignment marks 23 are formed together with the grating pattern and alignment marks 21 when the forming mold 30 forms the formed layer 4. In this case, as illustrated in FIG. 18, the forming mold 30 is provided with a flange-shaped rim 31 surrounding the forming surface 30a, while the flat surface 31a of the rim 31 is provided with a pattern for transferring the alignment marks 23. The flat surface 6a of the overhang 6 is formed when the flat surface 31a of the rim 31 is pressed against the overhang 6; at this time, the alignment marks 23 are formed on the flat surface 6a of the overhang 6. Hence, as with the alignment marks 21, the alignment marks 23 are positioned with high precision with respect to the grating pattern (i.e., optical function part 10). When pressing the forming mold 30, the forming surface 30a of the forming mold 30 comes into contact with the opening 3a of the depression 3, whereby the thickness of the overhang 6 can be made uniform easily and securely.

Thus constructed optical element 1 of the fifth embodiment exhibits the following effects in addition to those of the optical element 1 of the fourth embodiment.

That is, when accommodating a photodetection unit for detecting light spectrally resolved by the optical function part 10 together with the optical element 1 in a package provided with a light entrance part, for example, the photodetection unit can be positioned with respect to the optical function part 10 with reference to the alignment marks 23 in addition to the alignment marks 21. At this time, the alignment marks 23 are located on the flat surface 6a of the overhang 6 and thus are easily discernible when seen in the depth direction of the depression 3.

Since the overhang 6 of the formed layer 4 is made flat, photodetection units and the like can be stacked on the optical element 1 or arranged near each other thereon. As the overhang 6 is made flat, the contact area between the overhang 6 and the surface 2a of the base 2 increases, whereby the formed layer 4 can more securely be prevented from peeling off the base 2.

The present invention is not limited to the first to fifth embodiments thereof explained in the foregoing. For example, refractive index matching may be effected at the interface between the base 2 and the formed layer 4, so that light L is incident on the optical function part 10 from the base 2 side (the other side). When incident on the optical function part 10 (e.g., transmission grating) either from one side or the other, the light L may be transmitted therethrough without the reflecting film 7.

The inner face of the depression 3 formed in the surface 2a of the base 2 may be a curved surface such as a continuous curved surface. The predetermined surface of the formed layer 4 provided with the optical function part 10 is not limited to the curved surface 4b but may be a flat surface and the like. The predetermined surface is not required to extend from the main part 5 to the overhang 6 as long as it is formed at least in the main part 5. In contrast, the optical function part 10 may extend from the main part 5 to the overhang 6.

The overhangs 6 may oppose each other in any direction through the depression 3 interposed therebetween. One set of overhangs 6 may be provided alone so as to oppose each other through the depression 3 interposed therebetween. A plurality of overhangs 6 may be provided, e.g., at intervals of 120°, so as to surround the depression 3 without opposing each other through the depression 3 interposed therebetween. The overhang 6 may be continuous on the surface 2a of the base 2.

When pressing the forming mold 30 against the forming material in the method of manufacturing the optical element 1, the forming surface 30a of the forming mold 30 may be kept away from the base 2 at the opening 3a of the depression 3 and the like.

INDUSTRIAL APPLICABILITY

The present invention can prevent the formed layer from peeling and the optical function part from deforming.

REFERENCE SIGNS LIST

1 . . . optical element; 2 . . . base; 2a . . . surface; 3 . . . depression; 3a . . . opening; 3b . . . bottom face (inner face); 4 . . . formed layer; 4b . . . curved surface (predetermined surface); 5 . . . main part (first part); 6 . . . overhang (second part); 10 . . . optical function part; 30 . . . forming mold; 30a . . . forming surface

The invention claimed is:

1. An optical element comprising:
a base having a surface formed with a depression and a formed layer disposed on the base,
wherein the formed layer has a first part located within the depression when seen in a thickness direction of the depression and an overhanging second part located outside of the depression on the surface of the base while being connected to the first part; and
wherein a predetermined surface in the first part opposing an inner face of the depression is provided with an optical function part,
wherein a predetermined surface in at least one of the first and second parts is provided with a reflective layer.

2. An optical element according to claim 1, wherein a plurality of such second parts are provided so as to oppose each other through the depression interposed therebetween.

3. An optical element according to claim 1, wherein a plurality of such second parts are provided so as to surround the depression.

4. An optical element according to claim 1, wherein the optical function part is a grating.

5. An optical element according to claim 1, wherein the optical function part is a mirror.

6. A method of manufacturing an optical element comprising the steps of:
preparing a base having a surface formed with a depression; and
disposing a forming material on the base; and
pressing a forming mold against the forming material and curing the forming material so as to form a formed layer having a first part located within the depression when seen in a thickness direction of the depression and an overhanging second part located outside of the depression on the surface of the base while being connected to the first part,
wherein the forming mold is formed so as to come into intermittent contact with an opening of the depression when the forming mold is pressed against the forming material,
wherein the forming mold has a forming surface for forming the first part with a predetermined surface to be provided with an optical function part such that the predetermined surface opposes an inner face of the depression; and
coating a predetermined surface of at least one of the first and second parts with a reflective layer.

* * * * *